US008364043B2

(12) United States Patent
Lee et al.

(10) Patent No.: US 8,364,043 B2
(45) Date of Patent: Jan. 29, 2013

(54) METHOD AND APPARATUS FOR CONTROLLING REFLECTIVE SEMICONDUCTOR OPTICAL AMPLIFIER (RSOA)

(75) Inventors: Jie-hyun Lee, Daejeon-si (KR); Seung-hyun Cho, Daejeon-si (KR); Byoungi-whi Kim, Daejeon-si (KR); Jea-hoon Yu, Daejeon-si (KR); Jai-sang Koh, Gwangiu-si (KR)

(73) Assignee: Electronics and Telecommunications Research Institute (KR)

( * ) Notice: Subject to any disclaimer, the term of this patent is extended or adjusted under 35 U.S.C. 154(b) by 548 days.

(21) Appl. No.: 12/633,006

(22) Filed: Dec. 8, 2009

(65) Prior Publication Data

US 2010/0150574 A1    Jun. 17, 2010

(30) Foreign Application Priority Data

Dec. 12, 2008  (KR) .................. 10-2008-0126810
Apr. 14, 2009  (KR) .................. 10-2009-0032218

(51) Int. Cl.
*H04B 10/00*  (2006.01)

(52) U.S. Cl. ..... 398/160; 398/157; 398/167; 398/167.5; 398/66

(58) Field of Classification Search .............. 398/66–72, 398/157, 160, 91–94, 156, 167, 167.5
See application file for complete search history.

(56) References Cited

U.S. PATENT DOCUMENTS

| 7,110,168 | B2 |  | 9/2006  | Lee et al. |  |
|---|---|---|---|---|---|
| 7,599,624 | B2 | * | 10/2009 | Park et al. | 398/75 |
| 7,929,584 | B2 | * | 4/2011  | Zhang et al. | 372/26 |
| 8,086,102 | B2 | * | 12/2011 | Kim et al. | 398/67 |
| 2006/0093359 | A1 | * | 5/2006 | Lee et al. | 398/70 |
| 2006/0093360 | A1 | * | 5/2006 | Kim et al. | 398/71 |
| 2006/0153566 | A1 | * | 7/2006 | Sorin et al. | 398/72 |
| 2007/0133990 | A1 | * | 6/2007 | Kim et al. | 398/72 |
| 2007/0183788 | A1 | * | 8/2007 | Kim et al. | 398/160 |
| 2008/0187314 | A1 | * | 8/2008 | Chung et al. | 398/72 |
| 2008/0279557 | A1 | * | 11/2008 | Park et al. | 398/79 |
| 2009/0220230 | A1 |  | 9/2009 | Kim et al. |  |
| 2010/0150560 | A1 | * | 6/2010 | Lee et al. | 398/79 |
| 2010/0278535 | A1 | * | 11/2010 | Kim | 398/72 |
| 2010/0316386 | A1 | * | 12/2010 | Luk et al. | 398/93 |
| 2011/0026923 | A1 | * | 2/2011 | Kim et al. | 398/79 |
| 2011/0091214 | A1 | * | 4/2011 | Cheng | 398/91 |
| 2011/0135309 | A1 | * | 6/2011 | Lee et al. | 398/79 |

(Continued)

OTHER PUBLICATIONS

Automatic Power Control Scheme of Reflective SOA as Optical Network Unit Transmitter in Passive Optical Network Tae-Young Kim, Hyuk-Choon Kwon and Sang-Kook Han Yonsei University, Dept of Electrical & Electronic Engg., 134 Shinchon, Sudaemon, Seoul, Korea, @ Sep. 24-28, 2006.*

(Continued)

*Primary Examiner* — Kenneth N Vanderpuye
*Assistant Examiner* — Hibret Woldekidan
(74) *Attorney, Agent, or Firm* — Blakely, Sokoloff, Taylor & Zafman

(57) ABSTRACT

A method and apparatus for controlling a reflective semiconductor optical amplifier (RSOA) are provided. The RSOA control apparatus sets a threshold current at which a light source starts to oscillate to be constant regardless of a wavelength of seed light by controlling a driving temperature for driving a RSOA, and adjusts an optical characteristic which is differently output for each wavelength of seed light to be constant by controlling a driving current.

11 Claims, 12 Drawing Sheets

U.S. PATENT DOCUMENTS

2011/0222855 A1* 9/2011 Kim et al. .................. 398/79
2012/0163822 A1* 6/2012 Cho et al. .................. 398/79

OTHER PUBLICATIONS

Demonstration of WDM-PON with 50 GHz channel spacing employing spectrum-sliced reflective semiconductor optical amplifiers S.-B. Park, D.K. Jung, D.J. Shin, H.S. Shin, I.K. Yun, J.S. Lee, Y.K. Oh and Y.J. Oh @ Sep. 28, 2006.*

WDM PON with a single SLED seeding colorless RSOA-based OLT and ONUs by F. Payoux (1), P. Chanclou (1), R. Brenot (2) 1: France Telecom Research and Development Division, 2 Avenue Pierre Marzin, 22307 Lannion, France; franck. payoux@francetelecom .com 2: Alcatel-Thales III-V Lab, route de Nozay, 91461 Marcoussis, France, @ Sep. 24-28, 2006.*

Bias and temperature effects of an enjection locked reflective SOA upstream transmitter in WDM-PON with 200GHz Channel bandwidth, Yi Hung Lin, Tzu-Kang Cheng, Yu-Chieh Chi, Gong-Cheng Lin, Gong-Ru Lin @ Aug. 2008.*

Park, S.B., et al., "Demonstration of WDM-PON with 50 GHz Channel Spacing Employing Spectrum-sliced Reflective Semiconductor Optical Amplifiers," *Electronics Letters*, vol. 42, No. 20, Sep. 28, 2006, 2 pages.

Kim, T.Y., et al., "Automatic Power Control Scheme of Reflective SOA as Optical Network Unit Transmitter in Passive Optical Network," *ECOC*, Yonsei Univ., Dept. of Electrical & Electronic Engg., Seoul, KR, 2006 (2 pages).

* cited by examiner

METHOD AND APPARATUS FOR CONTROLLING REFLECTIVE SEMICONDUCTOR OPTICAL AMPLIFIER (RSOA)

CROSS-REFERENCE TO RELATED APPLICATIONS

This application claims the benefit under 35 U.S.C. §119 (a) of Korean Patent Application Nos. 10-2008-0126810, filed on Dec. 12, 2008, 10-2009-0032218, filed on Apr. 14, 2009, the disclosures of which are incorporated herein in their entirety by reference.

BACKGROUND

1. Field

The following description relates to an optical transmission technique, and more particularly, to a reflective semiconductor optical amplifier (RSOA) control technique in a RSOA-based loop-back wavelength division multiplexing-passive optical network (WDM-PON).

2. Description of the Related Art

A WDM-PON is a next generation optical network technology using WDM that overcomes the drawbacks of extension and security of an Ethernet PON (EPON) and provides a high-capacity high-quality service.

However, the WDM-PON poses an economic burden to subscribers since it needs as many specific light sources as the number of subscribers. In order to resolve this problem, a WDM-PON in which a reflective semiconductor optical amplifier (RSOA) is used as a light source using a loop-back method has been suggested.

In a RSOA-based loop-back WDM-PON, an independent light source is not provided to a subscriber, but a downlink signal transmitted from a central office (CO) is modulated or re-modulated through a RSOA, and the modulated or re-modulated signal is transmitted to the CO. Since a signal which is transmitted from the CO to the subscriber side has an individual wavelength, a distributed feedback-laser diode (DFB-LD) or a broadband light source (BLS) may be used as an independent light source.

In order to resolve a price burden and an equipment maintenance problem, a WDM-PON is being evolved into a RSOA-based loop-back WDM-PON in which a RSOA of a seed-light-injection method is used so that optical wavelengths need not be divided into individual wavelengths at the CO side.

SUMMARY

The following description relates to a RSOA control method and apparatus in which an optical signal for driving a RSOA of an optical network unit (ONU) or an optical network terminal (ONT) or a central office (CO) may have a constant optical characteristic regardless of a seed light injected into a RSOA of an optical line terminal (OLT) in a RSOA-based loop-back WDM-PON.

In one general aspect, there is provided a method of controlling a reflective semiconductor optical amplifier (RSOA), including setting a threshold current at which a light source starts to oscillate to be constant regardless of a wavelength of seed light by controlling a driving temperature for driving a RSOA, and adjusting an optical characteristic, which is produced differently according to each wavelength of the seed light, to be constant by controlling a driving current.

The optical characteristic may include at least one of an extinction ratio which represents a strength ratio between a minimum optical power value which means 0 and a maximum optical power value which means 1, a peak-to-peak jitter value of an optical signal, and optical power of an optical signal.

In another general aspect, there is provided an apparatus for controlling a reflective semiconductor optical amplifier (RSOA), including a driving temperature controller which controls a driving temperature for driving a RSOA to set so that a threshold current at which a light source starts to oscillate is constant regardless of a wavelength of seed light, and an optical characteristic controller which constantly adjusts an optical characteristic which is produced differently according to each wavelength of seed light injected into a RSOA.

Other objects, features and advantages will be apparent from the following description, the drawings, and the claims.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. Also, descriptions of well-known functions and constructions are omitted to increase clarity and conciseness.

Figure 1:
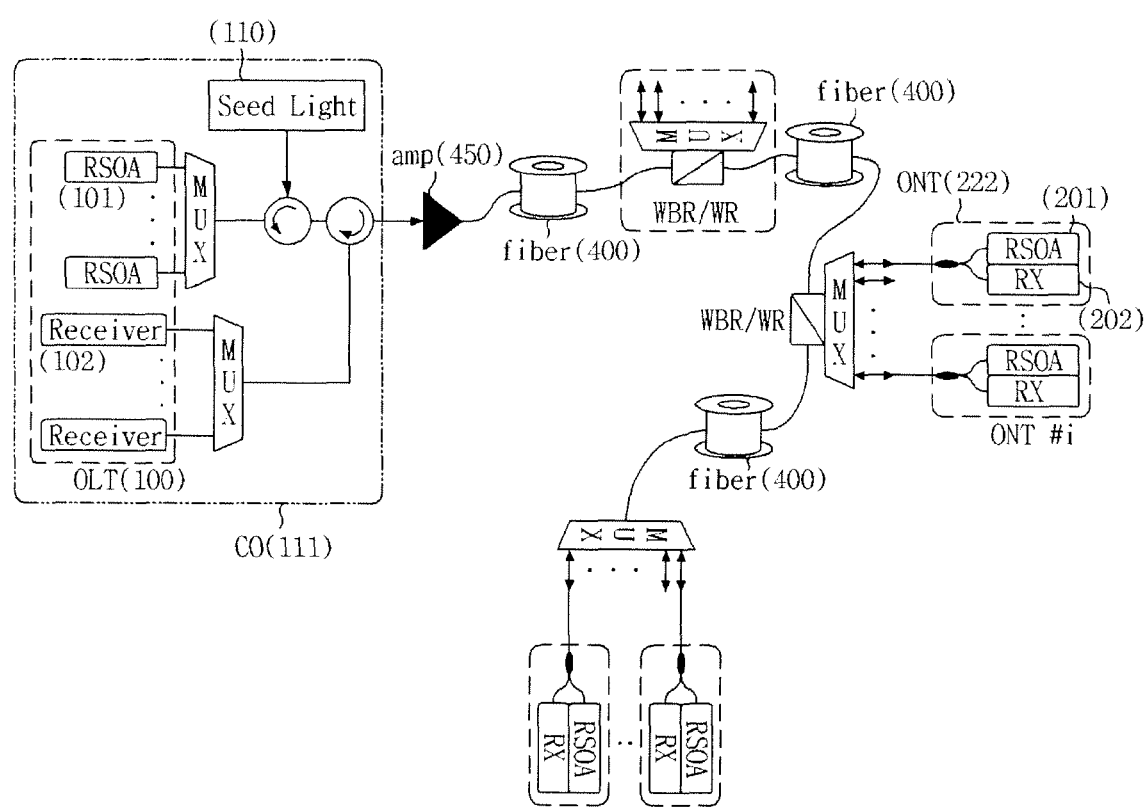
FIG. 1 is a configuration diagram of a RSOA-based loop-back WDM-PON according to an exemplary embodiment.

FIG. 1 is a configuration diagram of a RSOA-based loop-back WDM-PON according to an exemplary embodiment. Referring to FIG. 1, a RSOA-based loop-back WDM-PON includes a central office (CO) 111 having an optical line terminal (OLT) 100, and a remote node (RN) 300, and an optical network unit (ONU) or an optical network terminal (ONT) 222.

The CO 111 includes the OLT 100 and a seed light 110. The OLT 100 includes a RSOA of a seed light injection method and a receiver 102 which receives an uplink signal.

The seed light 110 may be a fixed wavelength type single mode laser (SML), a variable wavelength type SML, a broadband light source (BLS), or a pre-sliced BLS, but is not limited to them. An output of the seed light 110 may be multiplexed through an optical power splitter.

The ONT 222 includes a RSOA for transmitting an uplink signal and a receiver (RX) 202 for receiving a downlink signal. The RN 300 connects and relays between the OLT 100 and the ONTs 222 through optical fibers 400. The RSOA-based loop-back WDM-PON may further include an optical amplifier 450 from the point of view of a link margin.

In the RSOA-based loop-back WDM-PON, since there is no separate seed light for an uplink signal, a downlink optical signal is re-used as seed light. In order to re-use the optical signal, a gain saturation characteristic of the RSOA 201 included in the ONT 222 may be used. That is, The gain saturation characteristic controls the optical power of an incoming signal to be placed in a gain saturation area, so that a power difference between a level '0' and a level '1' of the incoming optical signal can be squeezed. A downlink optical signal of which a power difference between a level 0 and a level 1 is squeezed by use of the gain saturation characteristic may be used as seed light of the RSOA 201 disposed in the ONT 222.

Figure 2:
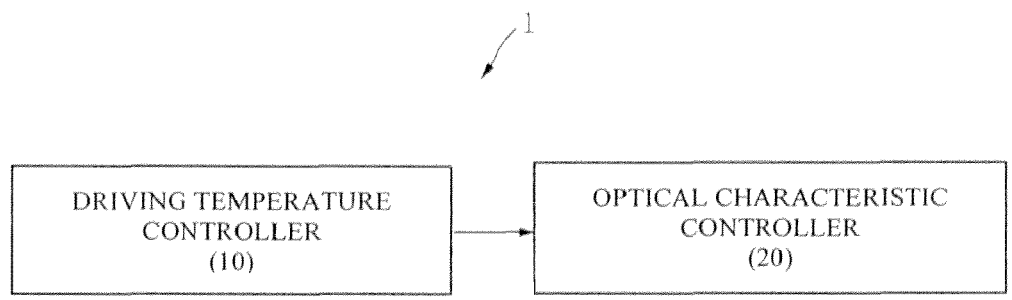
FIG. 2 is a block diagram of a RSOA control apparatus according to an exemplary embodiment.

FIG. 2 is a block diagram of a RSOA control apparatus 1 according to an exemplary embodiment.

The RSOA control apparatus 1 according to an exemplary embodiment controls an optical signal output from an OLT to maintain a constant optical characteristic regardless of a wavelength of seed light injected into a RSOA of an OLT in a RSOA-based loop-back WDM-PON. Referring to FIG. 2, the RSOA control apparatus 1 includes a driving temperature controller 10 and an optical characteristic controller 20.

The driving temperature controller 10 controls a driving temperature for driving a RSOA of an OLT. Therefore, a threshold current at which a light source starts to oscillate becomes similar regardless of a wavelength of injected seed light. A driving temperature of a cooled RSOA may be controlled using a thermo-electric cooler or a thermistor.

Figure 5:
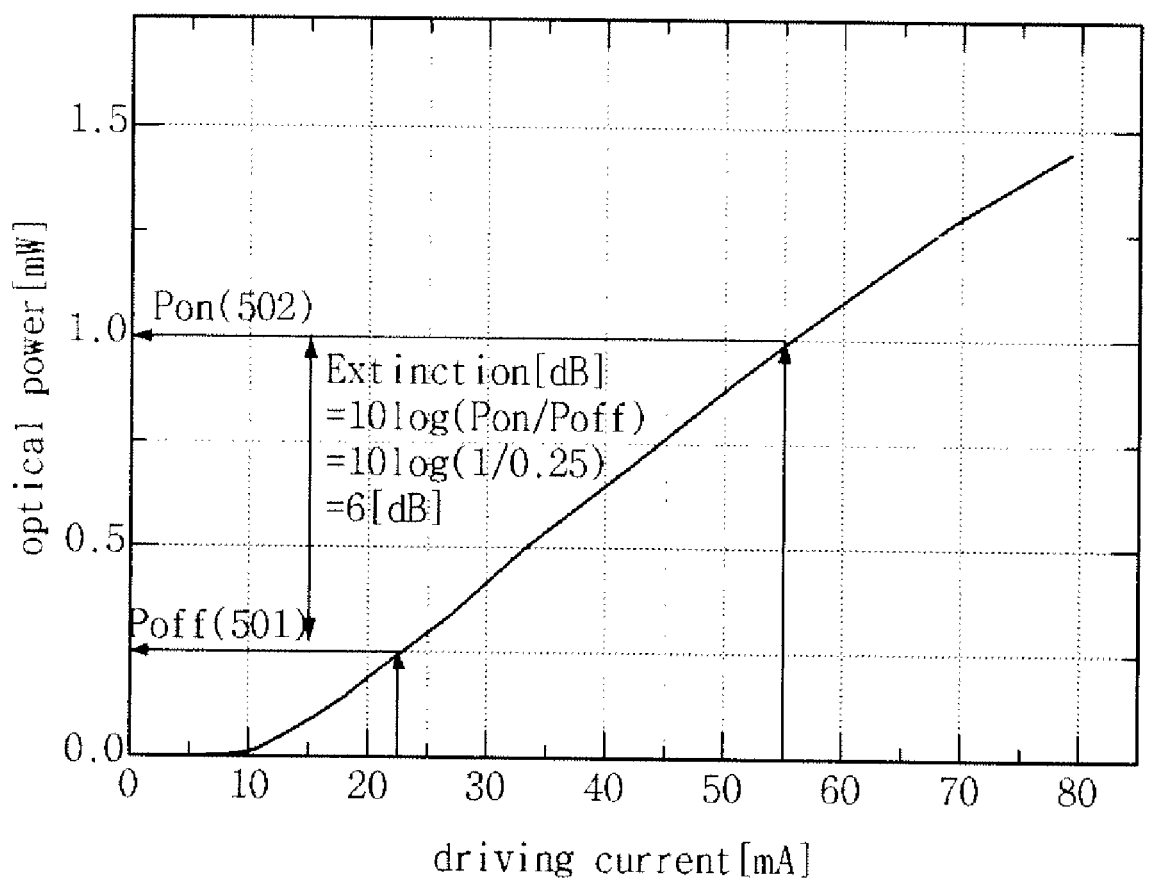
FIG. 5 is a graph illustrating a LI curve and an extinction ratio according to an exemplary embodiment.

The driving temperature controller 10 uses slope efficiency (SE) of a light-current curve (LI curve) of an optical signal which is generated depending on a wavelength of seed light in order to control a driving temperature. The LI curve is a graph in which an x-axis denotes a driving current, and a y-axis denotes optical power as illustrated in FIG. 5. The SE refers to the slope efficiency of the LI curve.

The driving temperature controller 10 compares a threshold current Ith1 when first wavelength seed light for forming the largest SE of the LI curve is injected with a threshold current Ith2 when second wavelength seed light for forming the smallest SE of the LI curve is injected with reference to the SE of the LI curve. The driving temperature is set again so that a difference |Ith1−Ith2| between the two threshold currents can be smaller than a previously set value. The driving temperature controller 10 may compare an amplified spontaneous emission (ASE) bandwidth of a RSOA with a wavelength band used for an optical link to set the driving temperature again.

The reason that the temperature control process described above is necessary is that a gain peak and a bandwidth of an ASE spectrum may vary depending on the driving temperature of a RSOA. When an ASE spectrum of a RSOA varies, since a relative position at which a wavelength of injected seed light is placed on an ASE spectrum is corrected, a LI characteristic deviation according to a wavelength of seed light can be reduced using this. The correction effect according to the driving temperature may depend on an effective thermo-optic coefficient of a semiconductor material used to manufacture a RSOA.

The optical characteristic controller 20 controls a driving current of an optical signal to constantly adjust an optical characteristic regardless of a wavelength of seed light injected into a RSOA of an OLT. An optical characteristic may include an extinction ratio representing a ratio between a minimum optical power value which means "0" and a maximum optical power value which means "1," a peak-to-peak jitter value of an optical signal, and optical power of an optical signal.

For example, the optical characteristic controller 20 sets a driving current for controlling an extinction ratio using a previously set value. The optical characteristic controller 20 sets a driving current for controlling a peak-to-peak jitter value of an optical signal to be smaller than a previously set value. As another example, the optical characteristic controller 20 sets a driving current for controlling optical power of an optical signal to be larger than a previously set value.

Therefore, the optical characteristic controller 20 can control so that amplitude squeezing can be constantly performed in a RSOA at the ONT side regardless of a wavelength. Here, seed light is a light source at the CO side of the loop-back WDM-PON in which the quality of both uplink and downlink is guaranteed, and is injected to use a RSOA.

Figure 3:
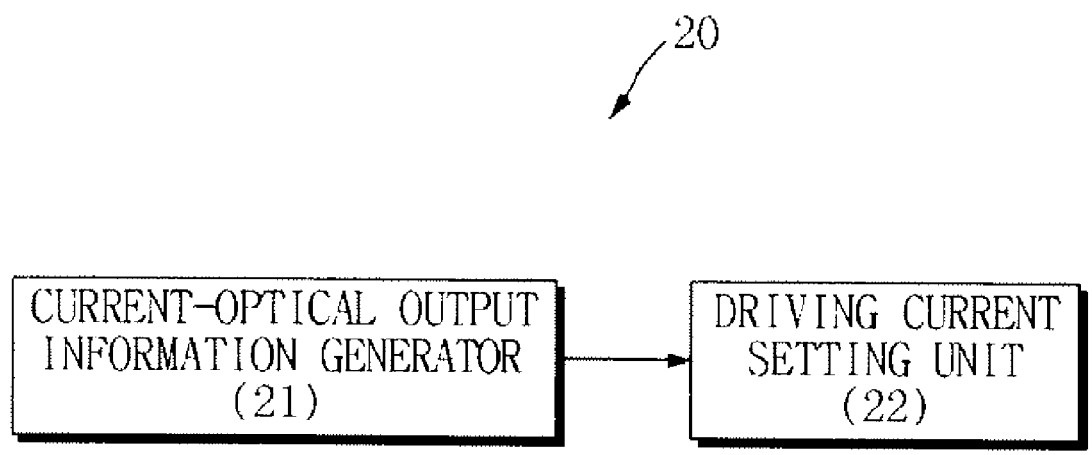
FIG. 3 is a block diagram of an optical characteristic controller of the RSOA control apparatus of FIG. 2.

FIG. 3 is a block diagram of the optical characteristic controller 20 of the RSOA control apparatus of FIG. 2. Referring to FIG. 3, the optical characteristic controller 20 includes a current-optical output information generator 21 and a driving current setting unit 22.

The current-optical output information generator 21 injects seed light into a RSOA of an OLT for each wavelength, and computes an optical power value according to a driving current of an optical signal for driving a RSOA of an OLT and generates a LI curve. The LI curve illustrates a driving current denoted by an x-axis and an optical power value denoted by a y-axis as illustrated in FIG. 5.

The driving current setting unit 22 sets a driving current for constantly controlling an optical output characteristic regardless of a wavelength of seed light using a current-optical power value computed through the current-optical power information generator 21.

Figure 4:
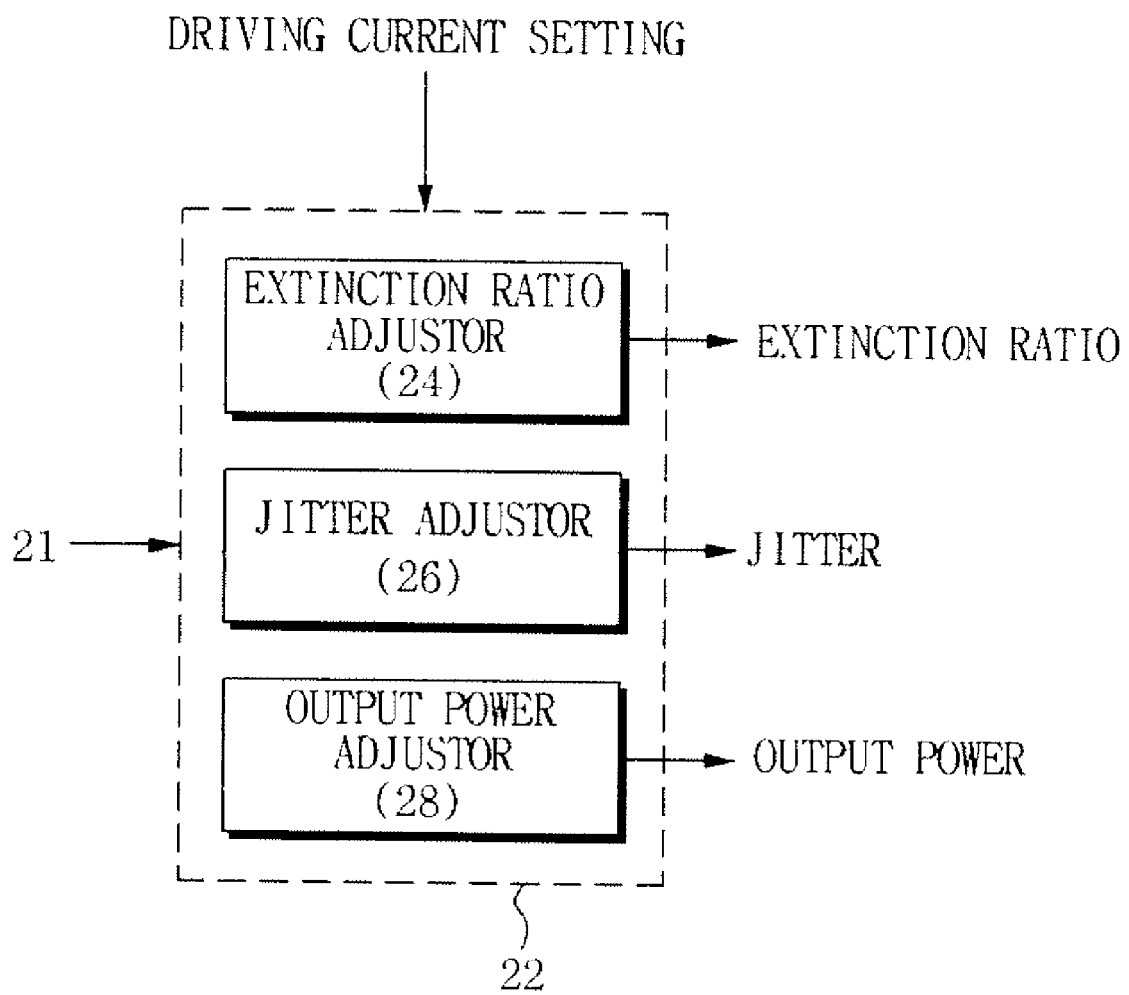
FIG. 4 is a block diagram of a driving current setting unit of the optical characteristic controller of FIG. 3.

FIG. 4 is a block diagram of the driving current setting unit 22 of the optical characteristic controller 20 of FIG. 3. Referring to FIG. 4, the driving current setting unit 22 includes an extinction ratio adjustor 24, a jitter adjustor 26, and an output power adjustor 28.

The extinction ratio adjustor 22 sets a driving current for controlling an extinction ratio, which represents a strength ratio between a minimum optical power value which means "0" and a maximum optical power value which means "1," to be identical to a previously set value.

The extinction ratio refers to a ratio between an optical output Poff which represents "Off" in the LI curve and an optical output Pon which represents "Pon" when a RSOA directly modulates an optical signal into ON and OFF and is commonly marked by a unit of "dB." For example, as illustrated in FIG. 5, when Pon 502 is 1 and Poff 501 is 0.25, the extinction ratio is 10 log(Pon/Poff), i.e., 6 dB.

As the SE of the LI curve increases or as a threshold current Ith at which a light source starts to oscillate decreases, the extinction ratio increases.

The SE and the threshold current Ith have different values according to an optical module. In particular, in the case of a RSOA which outputs optical power in a wide wavelength band, the SE and the threshold current Ith may have different values according to a wavelength of injected seed light. In this case, even though a link component sets a driving current value which can drive a RSOA to obtain a desired particular extinction ratio, if a wavelength of injected seed light becomes different, the extinction ratio may vary.

However, according to an exemplary embodiment, the extinction ratio adjustor 24 sets an optical link to have an extinction ratio around a previously set certain range regardless of a wavelength of injected seed light. The reason for having an extinction ratio around a certain range regardless of a wavelength of injected seed light is not only that an extinction ratio determines the quality of a downlink optical signal but also that a downlink signal is used as seed light in a RSOA in an ONU. That is, when an extinction ratio of a downlink optical signal is high, amplitude squeezing is not properly performed in a RSOA in an ONU, and the quality of an uplink signal deteriorates, while when an extinction ratio of a downlink signal is too low, the quality of a downlink signal deteriorates. Therefore, the extinction ratio adjustor 24 sets an optical signal to have an extinction ratio around a previously set certain range.

The jitter adjustor 26 sets a driving current for controlling a peak-to-peak jitter value of an optical signal to be smaller than a previously set value.

In order to guarantee the quality of a RSOA-based loopback WDM-PON link, a peak-to-peak jitter value of an optical signal as well as an extinction ratio of an optical signal is a very important factor. Since a jitter value increases while passing through an optical link, when a peak-to-peak jitter value measured through an optical transmitter is equal to or more than a predetermined value, a bit error rate of a receiver may increase.

A peak-to-peak jitter value of an optical signal has a close relationship to a driving current. As an injection current of a semiconductor light source including a RSOA increases, a peak-to-peak jitter value decreases. Therefore, the jitter adjustor 26 sets a driving current so that a peak-to-peak jitter value of an optical signal can be smaller than a previously set value.

The output power adjustor 28 sets a driving current for controlling optical power of an optical signal to be larger than a previously set value.

FIG. 5 is a graph illustrating a LI curve and an extinction ratio according to an exemplary embodiment.

Referring to FIG. 5, the LI curve illustrates a driving current denoted by an x-axis and optical power denoted by a y-axis. That is, the LI curve of FIG. 5 is a graph illustrating an optical power according to a driving current. Here, the SE refers to the slope efficiency of the LI curve.

When a RSOA directly modulates an optical signal into "on" and "off," an extinction ratio means a ratio between an optical output Poff representing "Off" and an optical output Pon representing "On" in the LI curve and is commonly marked by a unit of dB.

Figure 6:
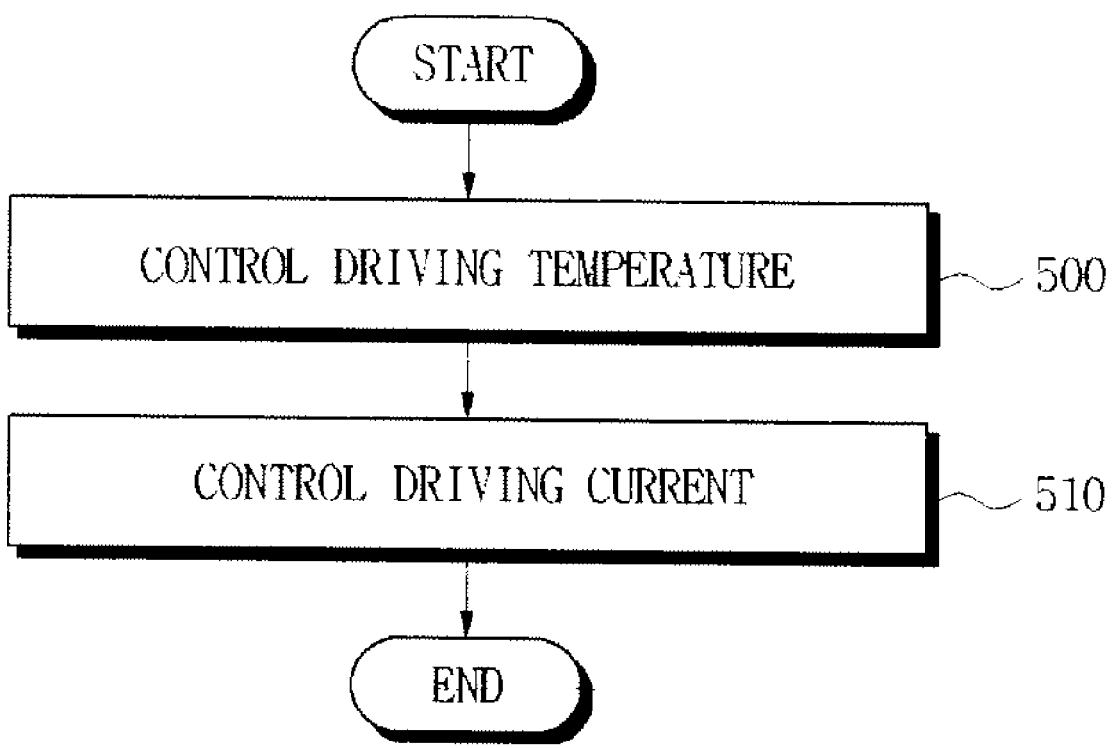
FIG. 6 is a flowchart illustrating a RSOA control method according to an exemplary embodiment.

FIG. 6 is a flowchart illustrating a RSOA control method according to an exemplary embodiment. The RSOA control apparatus according to an exemplary embodiment drives a RSOA so that an optical output characteristic of an OLT can be constant regardless of a wavelength of seed light injected into a RSOA of an OLT in a RSOA-based loop-back WDM-PON.

Referring to FIG. 6, the RSOA control apparatus controls a driving temperature of an optical signal for driving a RSOA of an OLT to set a threshold current to be constant regardless of a wavelength of seed light (operation 500).

The RSOA control apparatus controls a driving current of an optical signal to constantly adjust an optical characteristic which is differently output according to a wavelength of seed light injected into a RSOA of an OLT (operation 510). The RSOA control method of the RSOA control apparatus will be described below in detail with reference to the drawings.

Figure 7:
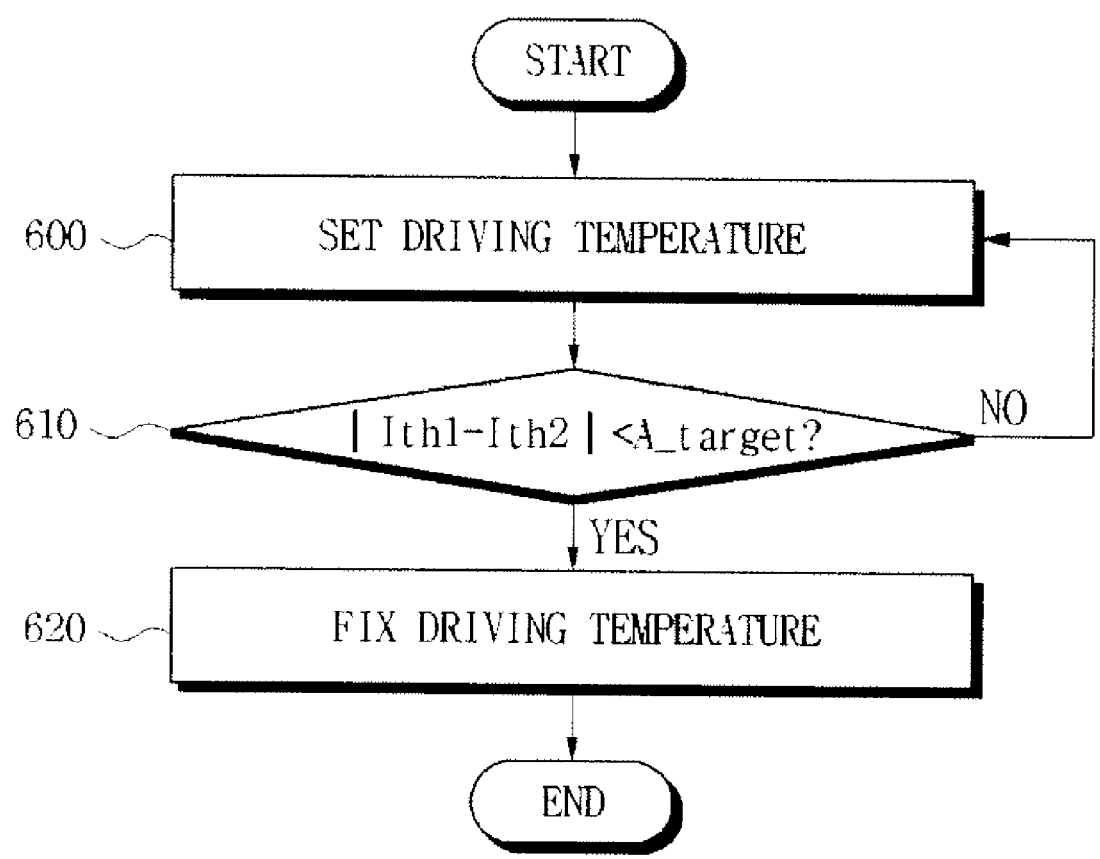
FIG. 7 is a flowchart illustrating a method of setting a driving temperature according to an exemplary embodiment.

FIG. 7 is a flowchart illustrating a method of setting a driving temperature according to an exemplary embodiment.

Referring to FIG. 7, in order to perform driving temperature control (operation 600), the RSOA control apparatus according to an exemplary embodiment compares a threshold current Ith1 when first wavelength seed light for generating the largest SE of the LI curve is injected with a threshold current Ith2 when second wavelength seed light for generating the smallest SE of the LI curve is injected with reference to the SE of the LI curve of an optical signal which is differently formed according to a wavelength of seed light.

When the difference |Ith1−Ith2| between two threshold currents is larger than a previously set value A_target, the RSOA control apparatus sets a driving temperature again (operation 600). At this time, the RSOA control apparatus may compare an ASE bandwidth of a RSOA with a wavelength band used for an optical link to set a driving temperature again.

On the other hand, when the difference |Ith1−Ith2| between two threshold currents is smaller than a previously set value A_target, the RSOA control apparatus stops varying a driving temperature of a RSOA and fixes a driving temperature (operation 620).

Figure 8:
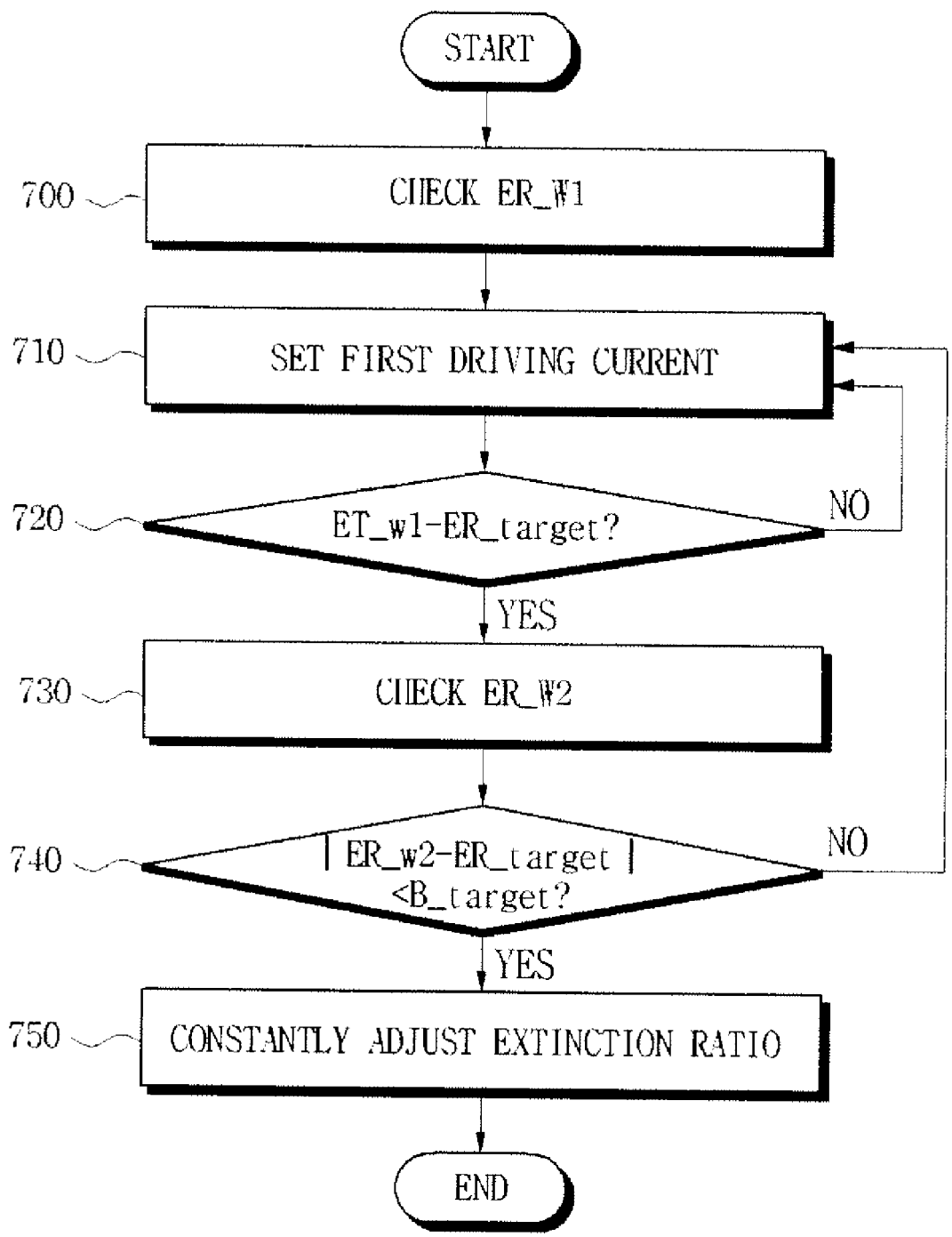
FIG. 8 is a flowchart illustrating a method of adjusting an extinction ratio through driving current control according to an exemplary embodiment.

FIG. 8 is a flowchart illustrating a method of adjusting an extinction ratio through driving current control according to an exemplary embodiment.

Referring to FIG. 8, in order to adjust an extinction ratio, the RSOA control apparatus according to an exemplary embodiment refers to the SE and the threshold current Ith of the LI curve of an optical signal which is differently formed according to a wavelength of seed light.

First, the RSOA control apparatus injects seed light into a RSOA of an OLT, measures a LI curve and finds out the SE and the threshold current Ith. The threshold current Ith may be set through the method described in FIG. 6. Here, let us assume that a wavelength for forming a LI curve having the smallest SE is a first wavelength w1, and a wavelength for forming a LI curve having the largest SE is a second wavelength w2.

Since a threshold current Ith_w1 at the first wavelength w1 and a threshold current Ith_w2 at the second wavelength w2 are controlled to be similar to each other within a value equal to or less than a certain value A_target through the process of setting the driving temperature again described in FIG. 7, the RSOA control apparatus then sets a driving current at which an optical link component obtains a desired extinction ratio ER_target.

First, the RSOA control apparatus checks a first extinction ratio ER_w1 when seed light of the first wavelength w1 is injected (operation 700) and sets a first driving current for obtaining the first extinction ratio ER_w1 (operation 710).

Next, the RSOA control apparatus determines whether or not the first extinction ratio ER_w1 is the previously set value ER_target (operation 720), and sets the first driving current again when the first extinction ratio ER_w1 is not identical to the previously set value ER_target (operation 710). To this end, the RSOA control apparatus injects seed light of the first wavelength w1 into a RSOA of an OLT again and sets the first driving current for making the first extinction ratio ER_w1 of the seed light of the first wavelength w1 identical to the extinction ratio ER_Target again.

However, when it is determined in operation 5710 that the first extinction ratio ER_w1 is identical to the previously set extinction ratio ER_target, a second extinction ratio ER_w2 is checked (operation 730). A difference between the second extinction ratio ER_w2 of the second wavelength seed light and a previous set extinction ratio B_target is computed while driving a RSOA of an OLT using the set first driving current (operation 740).

When the extinction ratio difference is equal to or more than a previously set value, the RSOA control apparatus injects the first wavelength seed light into a RSOA of an OLT. The first driving current for making the first extinction ratio ER_w1 of the first wavelength seed light identical to the previously set extinction ratio ER_target is set again (operation 710) to constantly adjust the extinction ratio (operation 750).

Figure 9:
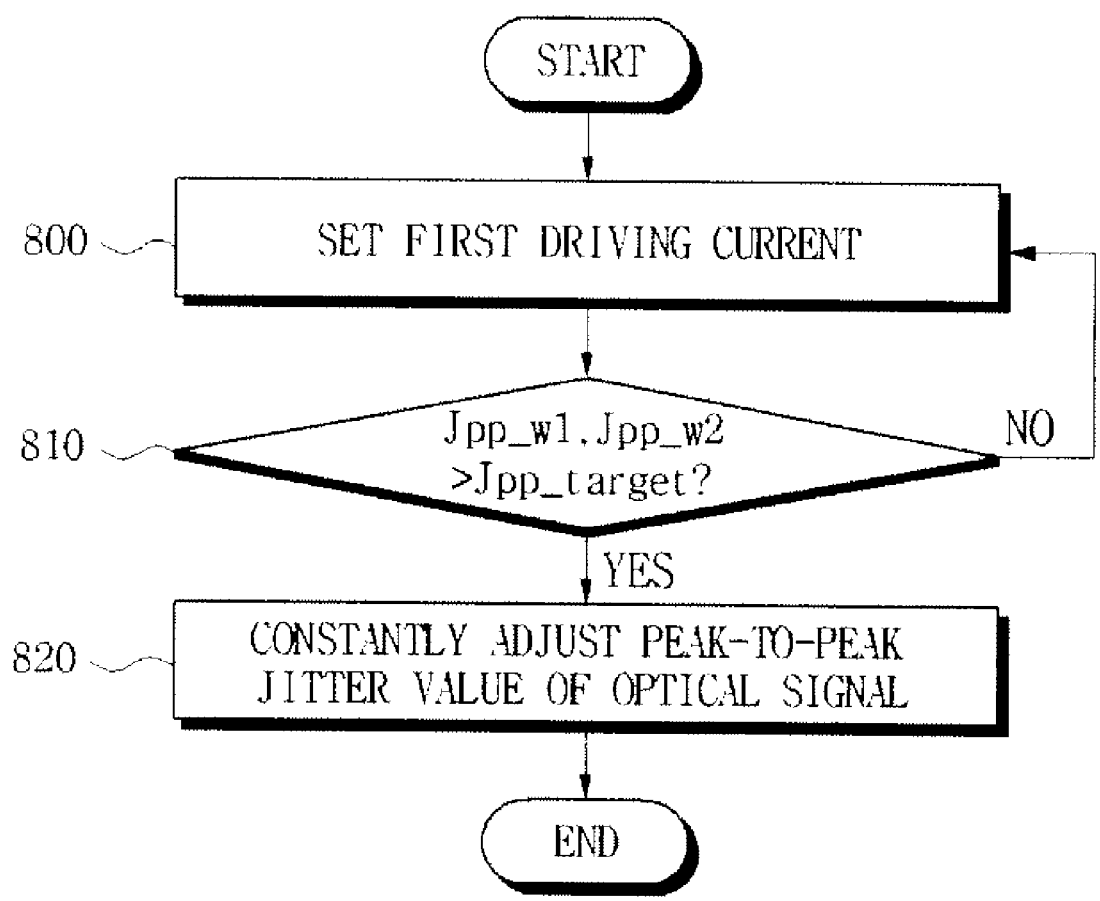
FIG. 9 is a flowchart illustrating a method of adjusting a peak-to-peak jitter value through driving current control according to an exemplary embodiment.

FIG. 9 is a flowchart illustrating a method of adjusting a peak-to-peak jitter value through driving current control according to an exemplary embodiment.

Referring to FIG. 9, the RSOA control apparatus sets a driving current for making a peak-to-peak jitter value when the first wavelength w1 seed light and the second wavelength w2 seed light are injected into the RSOA of the OLT smaller than a previously set value. Here, the first wavelength w1 is a wavelength of an optical signal for generating a LI curve having the smallest SE, and the second wavelength w2 is a wavelength for generating a LI curve having the largest SE. Peak-to-peak jitter value adjustment through driving current control described above may be performed after an extinction ratio is set.

First, the RSOA control apparatus determines whether or not peak-to-peak jitter values Jpp_w1 and Jppw2 of an optical eye when the first wavelength w1 seed light and the second wavelength w2 seed light are injected are equal to or less than a previously set value Jpp_target (operation 810).

When it is determined that the peak-to-peak jitter values Jpp_w1 and Jppw2 are larger than the previously set value Jpp_target, the first driving current is set again (operation 800). As a result, a peak-to-peak jitter value of an optical signal is constantly adjusted (operation 820). Since a current condition for satisfying that a peak-to-peak jitter value is equal to or less than the previously set value Jpp_target is a direction for increasing a current, there is no great error in progress of the flowchart.

Figure 10:
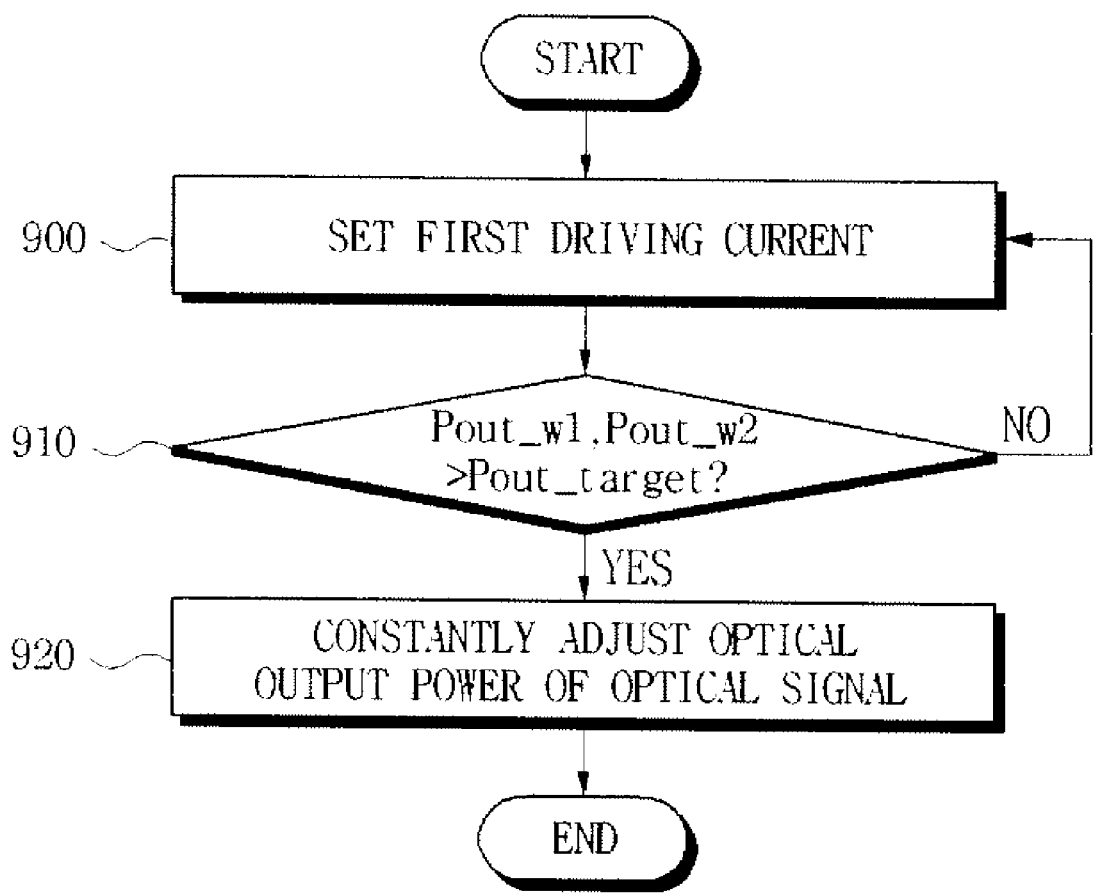
FIG. 10 is a flowchart illustrating a method of adjusting optical power through driving current control according to an exemplary embodiment.

FIG. 10 is a flowchart illustrating a method of adjusting optical power through driving current control according to an exemplary embodiment.

Referring to FIG. 10, the RSOA control apparatus sets a driving current for controlling optical power of an optical signal when the first wavelength w1 seed light and the second wavelength w2 seed light are injected to be larger than a previously set value. The first wavelength w1 is a wavelength of an optical signal for generating a LI curve having the smallest SE, and the second wavelength w2 is a wavelength for generating a LI curve having the largest SE. Optical power adjustment through driving current control described above may be performed after the jitter value is set.

First, the RSOA control apparatus determines whether or not optical power values Pout_w1 and Pout_w2 when the first wavelength w1 seed light and the second wavelength w2 see light are injected are equal to or larger than a previously set value Pout_target (operation 910).

When it is determined that the optical power values Pout_w1 and Pout_w2 are less than the previously set value Pout_target, the first driving current is set again (operation 900).

After the first driving current is set again (operation 900), when the optical power values Pout_w1 and Pout_w2 are equal to or larger than the previously set value Pout_target, the optical power value is constantly adjusted (operation 920). Since a current condition for satisfying that the output power value is equal to or larger than the previously set value Pout_target is a direction for increasing a current, there is no great error in the flowchart.

Figure 11:
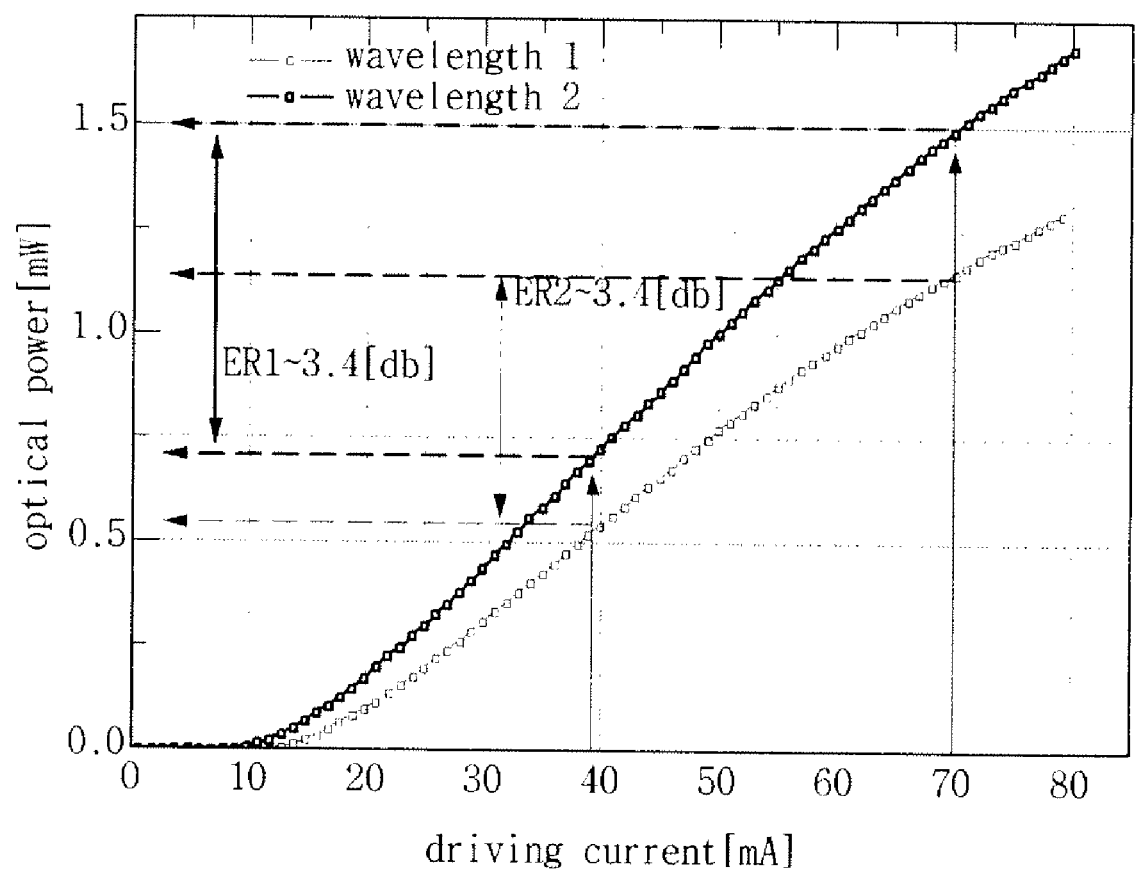
FIG. 11 is a graph illustrating that an extinction ratio is constant, regardless of a wavelength of an optical signal through RSOA control according to an exemplary embodiment.

FIG. 11 is a graph illustrating that an extinction ratio is constant, regardless of a wavelength of an optical signal through RSOA control according to an exemplary embodiment.

Referring to FIG. 11, an optical extinction ratio can be constantly controlled regardless of a wavelength of injected seed light through the RSOA control method according to an exemplary embodiment. For example, as illustrated in FIG. 11, when a ratio between an optical output when an extinction ratio is Off and an optical output when an extinction ratio is On is converted using dB, both a first wavelength wavelength 1 and a second wavelength wavelength 2 have extinction ratios ER1 and ER2 of about 3.4 dB.

Figure 12:
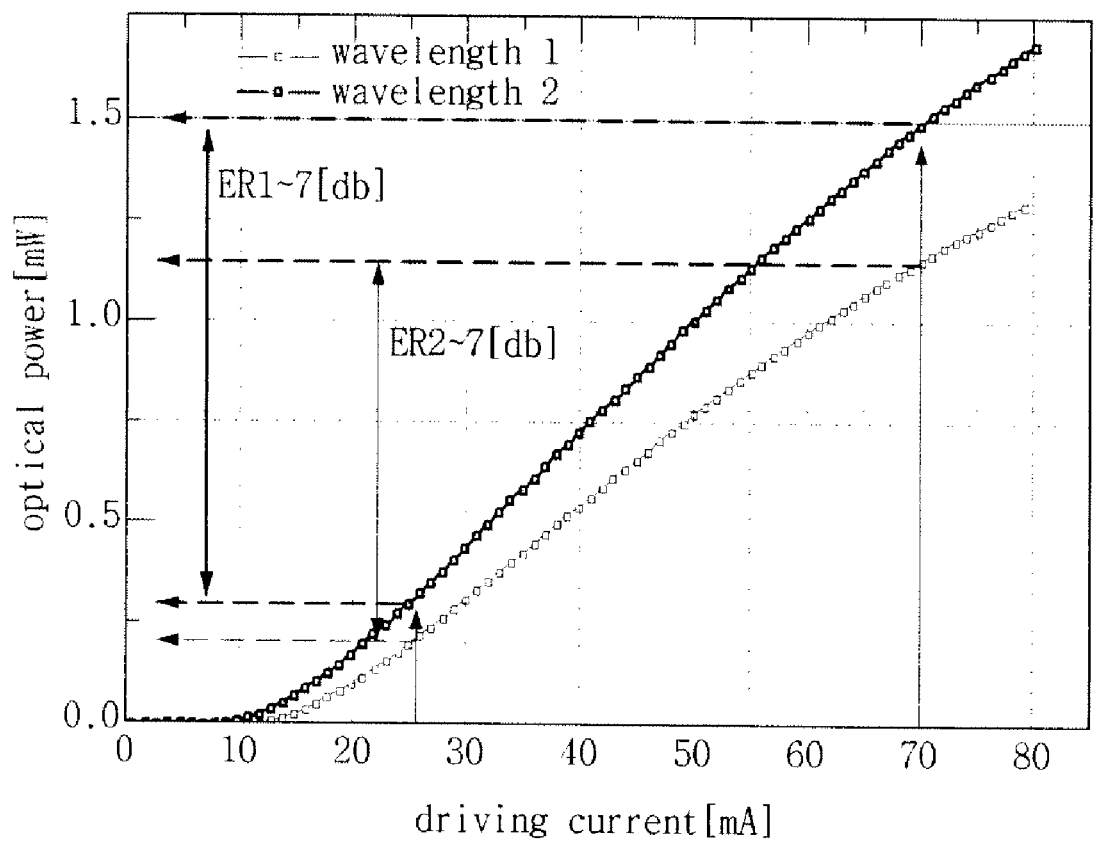
FIG. 12 is a graph illustrating that an extinction ratio is constant regardless of a wavelength of an optical signal through RSOA control according to another exemplary embodiment.

FIG. 12 is a graph illustrating that an extinction ratio is constant regardless of a wavelength of an optical signal through RSOA control according to another exemplary embodiment.

FIG. 12 is another embodiment illustrating a condition for driving a RSOA in order to obtain an extinction ratio of around 7 dB regardless of a wavelength of injected seed light through a RSOA described in FIG. 11 when an extinction ratio desired by a link component is about 6 dB. As illustrated in FIG. 12, both a first wavelength wavelength 1 and a second wavelength wavelength 2 have extinction ratios ER1 and ER2 of about 7 dB.

The present invention can be implemented as computer readable codes in a computer readable record medium. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

As apparent from the above description, an optical signal for driving a RSOA of an OLT can control to maintain a constant optical characteristic regardless of a wavelength of seed light injected into a RSOA of an OLT in a RSOA-based loop-back WDM-PON. In particular, an extinction ratio representing a strength ratio between a minimum optical power value which means "0" and a maximum optical power value which means "1," a peak-to-peak jitter value of an optical signal, and optical power of an optical signal can be constantly controlled regardless of a wavelength of seed light.

It will be apparent to those of ordinary skill in the art that various modifications can be made to the exemplary embodiments of the invention described above. However, as long as modifications fall within the scope of the appended claims and their equivalents, they should not be misconstrued as a departure from the scope of the invention itself.

What is claimed is:

1. A method of controlling a reflective semiconductor optical amplifier (RSOA), comprising:
    setting a threshold current, at which a light source starts to oscillate, to be constant regardless of a wavelength of seed light by controlling a driving temperature for driving a RSOA; and
    adjusting an optical characteristic, which is produced differently according to each wavelength of the seed light, to be constant by controlling a driving current,
    wherein the adjusting of the optical characteristic comprises:
    injecting seed light into a RSOA of an optical line terminal (OLT) for each wavelength and computing an optical power value according to a driving current for driving a RSOA of an optical network unit (ONU) or an optical network terminal (ONT); and
    setting the driving current to control an optical output characteristic, which is produced differently according to a wavelength of the seed light, to be constant using the computed optical power value.

2. The method of claim 1, wherein the optical characteristic includes at least one of an extinction ratio which represents a strength ratio between a minimum optical power value which means 0 and a maximum optical power value which means 1, a peak-to-peak jitter value of an optical signal, and optical power of an optical signal.

3. The method of claim 1, wherein the setting of the driving current to control the optical output characteristic comprises:
    setting a first driving current for making a first extinction ratio of first wavelength seed light which is largest in slope efficiency of a light-current (LI) curve identical to a previously set extinction ratio using the computed optical power value;
    computing a difference between a second extinction ratio of second wavelength seed light which is smallest in slope efficiency of the LI curve and the previous extinction ratio while driving the RSOA of the OLT using the set first driving current; and
    setting the first driving current for controlling the extinction ratio difference to be equal to or less than a previously set value again.

4. The method of claim 3, wherein the setting of the first driving current for controlling the extinction ratio difference comprises, when the extinction ratio is larger than the previously set value, re-injecting the first wavelength seed light into the RSOA of the OLT and re-setting the first driving current for making the first extinction ratio of the first wavelength seed light identical to the previously set extinction ratio.

5. The method of claim 3, wherein the setting of the driving current to control the optical output characteristic comprises setting a driving current to control a peak-to-peak jitter value when the first wavelength seed light and the second wavelength seed light are injected into the RSOA of the OLT less than a previously set value.

6. The method of claim 3, wherein the setting of the driving current to control the optical output characteristic comprises setting a driving current to control an optical power value of the optical signal when the first wavelength seed light and the second wavelength seed light are injected into the RSOA of the OLT larger than a previously set value.

7. The method of claim 1, wherein the controlling of the driving temperature for driving the RSOA comprises:
    measuring a slope efficiency of a light-current (LI) curve of an optical signal which is differently formed according to a wavelength of the seed light; and
    setting a driving temperature to control a difference between a threshold current of first wavelength seed light for forming the largest slope efficiency of the LI curve and a threshold current of second wavelength seed light for forming the smallest slope efficiency of the LI curve to be smaller than a previously set value according to the result of measurement.

8. The method of claim 1, wherein the setting of the driving temperature comprises comparing an amplified spontaneous emission (ASE) bandwidth of the RSOA with a wavelength band used for an optical link to set the driving temperature.

9. An apparatus for controlling a reflective semiconductor optical amplifier (RSOA), comprising:
    a driving temperature controller which controls a driving temperature for driving the RSOA such that a threshold current at which a light source starts to oscillate can be constant regardless of a wavelength of seed light; and
    an optical characteristic controller which adjusts an optical characteristic, which is produced differently according to each wavelength of seed light injected into the RSOA, to be constant,
    wherein the optical characteristic controller comprises:
    current-optical output information generator which injects seed light into a RSOA of an optical line terminal (OLT) for each wavelength and computes an optical power value according to it driving current for driving a RSOA of optical network unit (ONU) or an optical network terminal (ONT); and
    a driving current setting unit which sets the driving current to control an optical output characteristic which is differently formed according to a wavelength of the seed light to be constant using the computed optical power value.

10. The apparatus of claim 9, wherein the driving current setting unit comprises:
    an extinction ratio adjustor which sets a driving current for controlling a strength ratio between a minimum optical power value which indicates '0' and a maximum optical power value which indicates '1' to be identical to a previously set value;
    a jitter adjustor which sets a driving current for controlling a peak-to-peak jitter value of the optical signal to be larger than a previously set value; and
    an output power adjustor which sets a driving current for controlling optical power of the optical signal to be larger than a previously set value.

11. The apparatus of claim 9, wherein the driving temperature controller measures a slope efficiency of a light-current (LI) curve of an optical signal which is formed differently according to a wavelength of the seed light, finds first wavelength seed light for forming the largest slope efficiency of the LI curve and second wavelength seed light for forming the smallest slope efficiency of the LI curve according to the result of measurement, and sets a driving temperature for controlling a threshold difference when the seed light is injected to be smaller than a previously set value.

* * * * *